(12) United States Patent
Liang

(10) Patent No.: US 7,971,882 B1
(45) Date of Patent: Jul. 5, 2011

(54) LABYRINTH SEAL

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 101 days.

(21) Appl. No.: 12/636,822

(22) Filed: Dec. 14, 2009

Related U.S. Application Data

(63) Continuation of application No. 11/654,127, filed on Jan. 17, 2007, now abandoned.

(51) Int. Cl.
*F16J 15/447* (2006.01)

(52) U.S. Cl. .................... 277/418; 277/420; 415/174.5

(58) Field of Classification Search .......... 277/418–420; 415/174.5
See application file for complete search history.

(56) References Cited

U.S. PATENT DOCUMENTS

| | | | | | |
|---|---|---|---|---|---|
| 1,482,031 | A | * | 1/1924 | Parsons et al. | 277/420 |
| 2,916,332 | A | * | 12/1959 | Pavlecka | 384/109 |
| 3,251,601 | A | * | 5/1966 | Harvey | 277/424 |
| 3,940,153 | A | * | 2/1976 | Stocker | 277/418 |
| 4,335,886 | A | * | 6/1982 | Frey et al. | 277/412 |
| 4,370,094 | A | * | 1/1983 | Ambrosch et al. | 415/173.6 |
| 4,513,975 | A | * | 4/1985 | Hauser et al. | 277/415 |
| 5,222,742 | A | * | 6/1993 | Roberts | 277/420 |
| 5,224,713 | A | * | 7/1993 | Pope | 277/415 |
| 5,244,216 | A | * | 9/1993 | Rhode | 277/303 |
| 5,639,095 | A | * | 6/1997 | Rhode | 277/303 |
| 6,164,655 | A | * | 12/2000 | Bothien et al. | 277/303 |
| 6,276,692 | B1 | * | 8/2001 | Beeck et al. | 277/411 |
| 6,652,226 | B2 | * | 11/2003 | Albrecht et al. | 415/173.4 |
| 6,742,783 | B1 | * | 6/2004 | Lawer et al. | 277/416 |
| 7,445,213 | B1 | * | 11/2008 | Pelfrey | 277/418 |

* cited by examiner

*Primary Examiner* — Vishal Patel
(74) *Attorney, Agent, or Firm* — John Ryznic

(57) ABSTRACT

A stepped labyrinth seal having a plurality of teeth forming gaps between a stationary honeycomb member, where the cavities formed between adjacent teeth include a plurality of vortex flow generating strips on the wall of the cavity that redirect the leakage flow from a gap back toward the gap and in a direction toward the gap in order to limit the leakage flow through the gap. The vortex generating strips extend along the cavity floor and up the sides of the teeth forming the cavity. The strips slope downward from the downstream tooth toward the upstream tooth in the direction of rotation, and with a curvature in the direction of rotation. The stepped labyrinth seal is intended for use in a gas turbine engine having a plurality of stages in the turbine, with the labyrinth seal being used to seal the gap between rotating blades and the honeycomb surface on the stationary casing.

5 Claims, 3 Drawing Sheets

LABYRINTH SEAL

GOVERNMENT LICENSE RIGHTS

None.

CROSS-REFERENCE TO RELATED APPLICATIONS

This application is a CONTINUATION of U.S. patent application Ser. No. 11/654,127 filed on Jan. 17, 2007 and entitled LABYRINTH SEAL AND PROCESS FOR REDUCING LEAKAGE IN A LABYRINTH SEAL.

BACKGROUND OF THE INVENTION

1. Field of the Invention

The present invention relates generally to a labyrinth seal, and more specifically to a honeycomb seal used in a gas turbine engine.

2. Description of the Related Art including information disclosed under 37 CFR 1.97 and 1.98

Honeycomb seals are used in gas turbine engines such as those used to power an aircraft or a marine craft, or to produce electrical power. A gas turbine engine includes a turbine section that converts the energy in a hot gas flow passing through the turbine into mechanical work to drive the rotor shaft. The rotor shaft drivers the compressor and, in the case of an industrial gas turbine, drives the electric generator. The turbine includes a plurality of stages of rotor blades and stator vanes. In an industrial gas turbine engine, four stages of blades are found in the turbine. The rotor blades include blade tips with seal teeth extending outward that form a labyrinth seal with a honeycomb surface on the stationary part of the engine that also forms the flow path of the hot gas flowing through the turbine. The engine efficiency can be increased by reducing the flow leakage across the blade tips. Also, excess hot gas flow across the blade tip can cause thermal damage to the labyrinth seal, resulting in the life of the seal assembly to be reduced. In an industrial gas turbine engine, it becomes very costly to stop operation of the engine for unnecessary inspection and/or repairs due to worn parts.

Labyrinth seals have been used in gas turbine engines because they provide an effective seal for the hot gas flow between the rotating part and the stationary part. Also, labyrinth seals make use of a plurality of teeth with a cavity formed between adjacent teeth, the cavity functioning to provide a higher pressure against the gap between the tooth and the honeycomb seal face. This functions to limit leakage from one gap to another. A typical gas turbine engine labyrinth seal assembly will include three to five teeth forming two to four cavities in which the leakage would have to traverse.

U.S. Pat. No. 6,652,226 B2 issued to Albrecht, Jr. et al on Nov. 25, 2003 and entitled METHODS AND APPARATUS FOR REDUCING SEAL TEETH WEAR discloses a stepped labyrinth seal which is shown in FIG. 1 of this application. The labyrinth seal includes teeth extending from the rotating part toward the honeycomb material secured on the stationary part. Two teeth are shown in FIG. 1 to represent the concept of this seal. A gap or space will exist between the tooth and the honeycomb seal in which leakage will occur. In the prior art labyrinth seal of FIG. 1, the teeth are offset to form a stepped labyrinth seal in order that the gaps are not aligned along the leakage path. This results in less leakage.

The U.S. Pat. No. 5,244,216 issued to Rhode on Sep. 14, 1993 and entitled LABYRINTH SEAL shows this stepped labyrinth seal. The labyrinth seal is generally characterized by a series of cavities or grooves formed along the adjacent surfaces of two relatively movable members, where these members define a partial barrier between areas of high and low pressures. At successive stations or steps along the seal, the adjacent surfaces of these rotatable members are situated in close juxtaposition to each other such as to define annular slit-like orifices. Further in this type of seal design, a series of cavities or chambers are formed between these stations in order to retard fluid flow through the seal.

In operation, the previously described labyrinth design forms a seal between the rotatable members by forcing high velocity fluid to navigate the irregularly spaced adjacent surfaces formed between these relatively movable members, said fluid sequentially passing through the slit-like orifices to enter the enlarged cavities where the velocity of the fluid is largely dissipated in turbulence. In this, the basic concept of any labyrinth seal design is to create a highly frictional flow passage. Such a flow path will convert pressure energy into velocity energy, a large portion of which will be dissipated into heat via turbulent action.

In another such design, U.S. Pat. No. 1,482,031 issued to Parsons on Jan. 29, 1924 and entitled PACKING FOR ROTATING BODIES, a labyrinth seal is characterized by a radially stepped surface provided along the rotor, the stator being provided with a corresponding set of barrier members or collars disposed in close relationship thereto. In this fashion, high pressure fluid moving across the sealing surface will encounter interference; thus, minimizing leakage. In yet another design, U.S. Pat. No. 3,940,153 issued to Stocker on Feb. 24, 1976 and entitled LABYRINTH SEAL, the labyrinth seal is characterized by a succession of annular orifices or clearances between sealing teeth or knives on one member, and generally cylindrical surfaces or lands on the other. In combination, the sealing system defines a doubly re-curved flow path from each orifice to the orifice next downstream.

An improvement to the above cited prior art labyrinth seals is shown in U.S. Pat. No. 6,164,655 issued to Bothien et al on Dec. 26, 2000 and entitled METHOD AND ARRANGEMENT FOR SEALING OFF A SEPARATING GAP, FORMED BETWEEN A ROTOR AND A STATOR, IN A NON-CONTACTING MANNER in which a vortex flow is generated in a chamber downstream from the choke point (similar to the teeth gap) in order to reduce the leakage across the seal.

IN U.S. Pat. No. 6,276,692 B1 issued to Beeck et al on Aug. 21, 2001 and entitled NON-CONTACT SEAL OF GAPS IN GAS TURBINES, in which a seal is formed between a rotating member and a stationary member by inducing a vortex flow within a chamber formed between the two members. A secondary flow is injected into the vortex chamber from the stationary member to form the vortex flow. A guide lip and a guiding web formed from a plurality of curved guiding members fixed to the rotating member that induces further vortex flow in the chamber to seal the gap formed between the stationary member and the rotating member.

BRIEF SUMMARY OF THE INVENTION

The present invention is a stepped labyrinth seal with a vortex generating curved rib extending in the cavity between adjacent teeth, the curved ribs acting to redirect a portion of the leakage air flow back toward the upstream gap for the particular cavity and thus creating a vortex flow in the cavity. The vortex flow generating ribs accelerate the vortex flow toward and against the in-coming leakage air and thus producing a leakage inhibiting counter flow affect. As a result of this secondary flow interaction, a reduction in leakage is achieved across the labyrinth seal. The counter flow affect will continue throughout the entire labyrinth seal stage.

DETAILED DESCRIPTION OF THE INVENTION

The present invention is a labyrinth seal for use in a gas turbine engine, in which the labyrinth seal is formed between a rotating blade tip and a stationary honeycomb surface of the engine. However, the invention is a stepped labyrinth seal which could be used in any apparatus having a seal formed between a rotating member and a stationary member.

Figure 1:
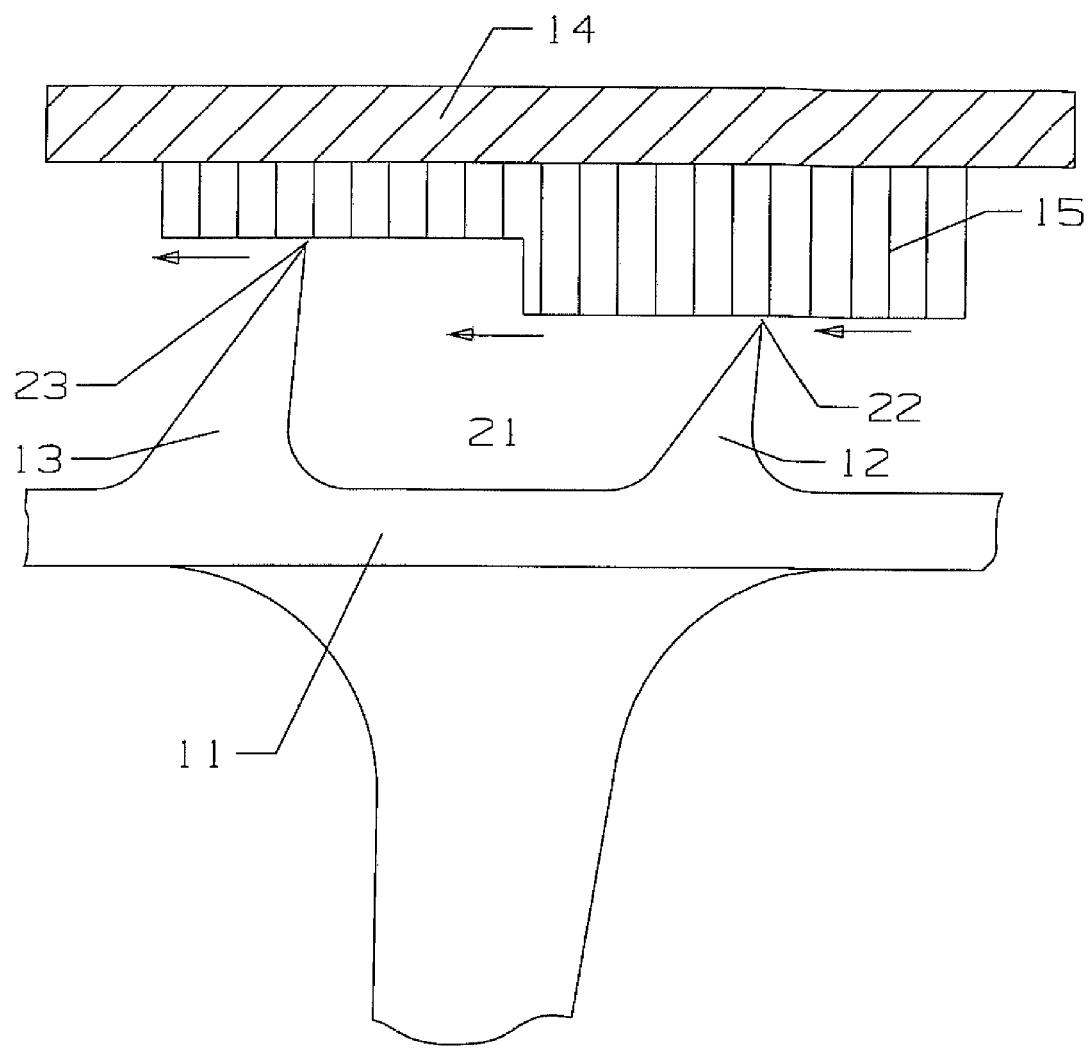
FIG. 1 shows a stepped labyrinth seal of the prior art.
Figure 2:
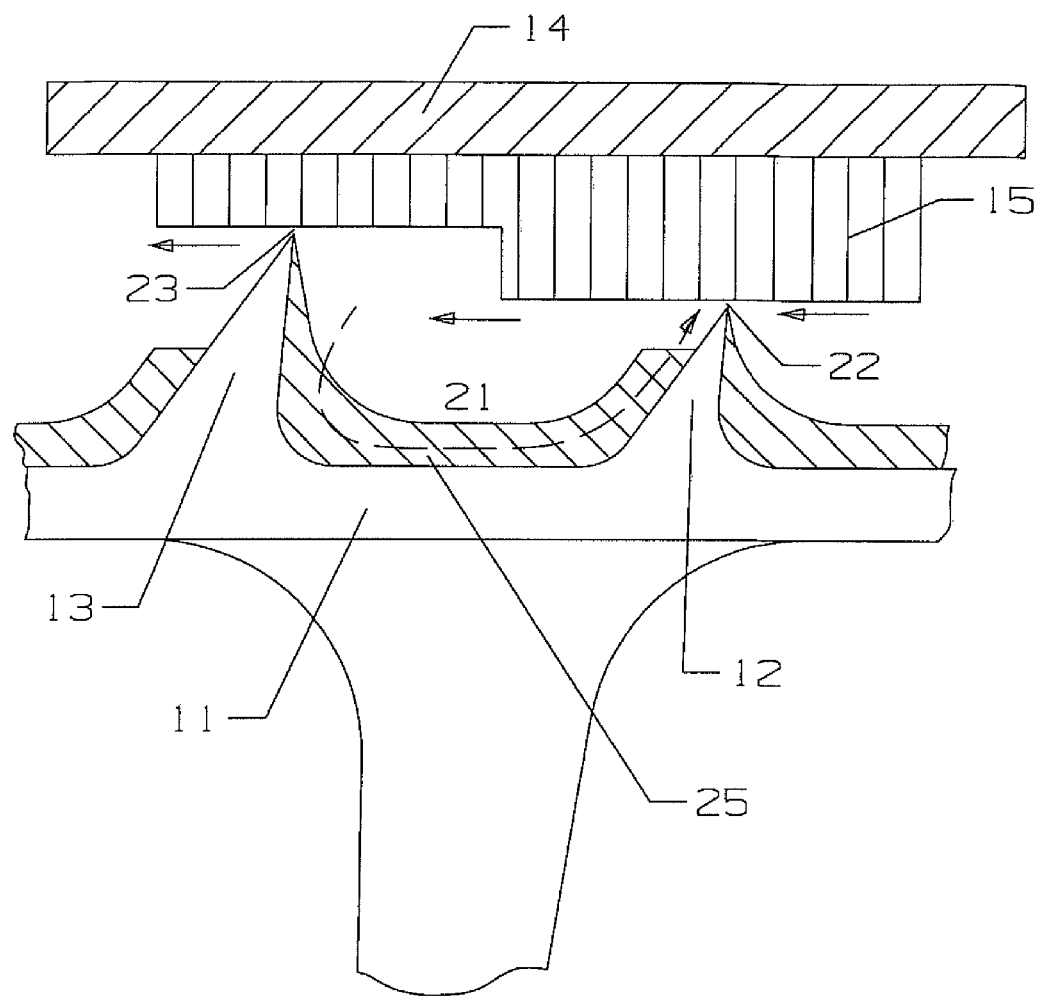
FIG. 2 shows a stepped labyrinth seal of the present invention with the vortex generating flow internal curved ribs.

FIG. 2 shows a stepped labyrinth seal having teeth (an upstream tooth 12 and a downstream tooth 13) extending from a rotating member 11, the teeth being angled in a direction toward the upstream side of the leakage flow. A honeycomb surface 15 secured to the stationary member 14 includes the stepped surface that forms two gaps (upstream gap 22 and downstream gap 23) for the leakage to flow across from the upstream gap 22 to the downstream gap 23. A cavity 21 or chamber is formed between the adjacent teeth 12 and 13 with a floor on the rotating member. Extending across the cavity between adjacent teeth is a row of vortex generating surfaces such as flow deflectors (or, vortex generating strips) 25 that are used in internal cooling passages of turbine blade to promote turbulent flow within the cooling air. The flow deflectors 25 extend from the floor of the cavity and from the inner sides of the teeth that form the cavity. The purpose of the flow deflectors 25 is to redirect a portion of the leakage flow back toward the upstream gap 22 such that the redirected flow will flow toward and against the incoming leakage flow through the upstream gap 22. The redirected leakage flow is a cortex-like flow. This redirected flow produces a leakage inhibiting counter flow to the leakage flow.

Figure 3:
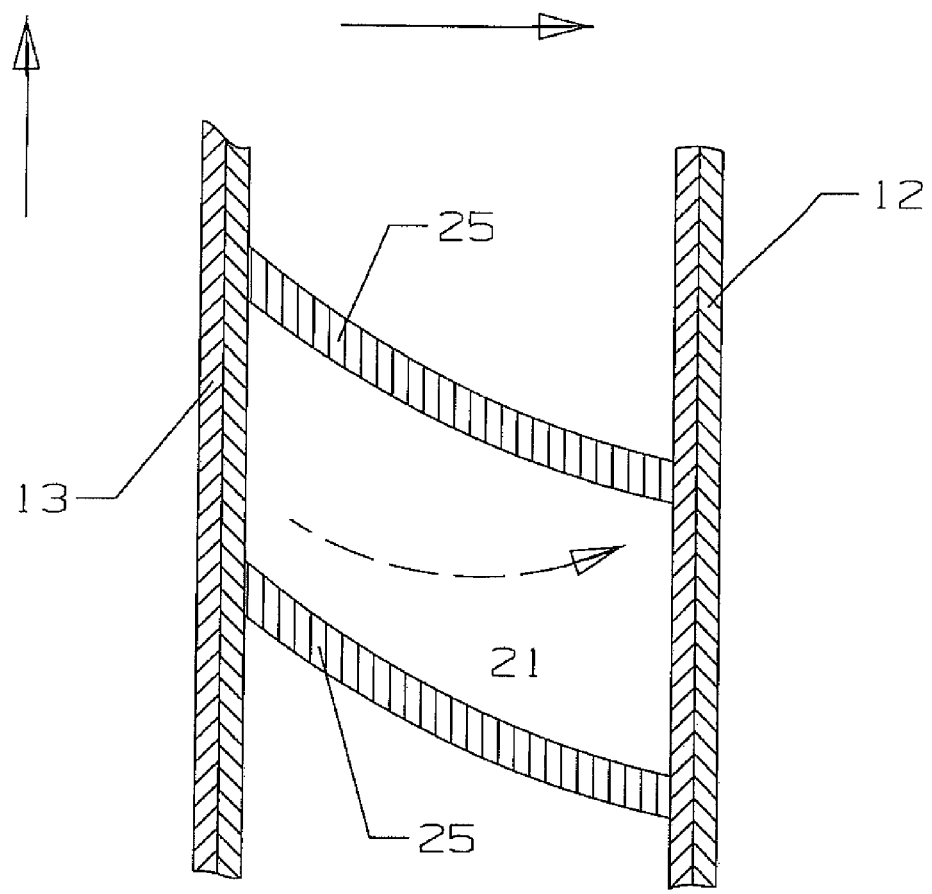
FIG. 3 shows a top view of a row of curved ribs between adjacent teeth of the labyrinth seal of the present invention.

FIG. 3 shows a top view of the labyrinth seal teeth 12 and 13 and curved ribs 25 of the FIG. 2 embodiment. The rotating direction of the teeth in FIG. 3 is in the upward direction of the sheet as depicted by the arrow. The upstream tooth 12 is on the right side of the figure, and the downstream tooth 13 is on the left side. The flow deflectors 25 extend from the downstream tooth 13 to the upstream tooth 12 in a curved and downward sloping direction from right to left. As seen in FIG. 2, the flow deflectors extend along the cavity floor and up the side of the downstream tooth, narrowing along the downstream tooth until the trip strip end blends into the tooth surface. On the upstream tooth surface, the flow deflectors 25 abruptly ends about ⅔rds of the distance up the tooth. The flow deflectors force a portion of the leakage air to flow in a direction indicated by the arrow in FIG. 3. This secondary flow or counter flow is redirected toward the upstream gap 22 formed between the upstream teeth 12 and the honeycomb surface to limit the amount of fluid leaking through the upstream gap. In the actual labyrinth seal, a plurality of cavities are arranged in series with adjacent teeth forming the stepped labyrinth seal, and where the cavities formed between adjacent teeth includes a row of flow deflectors to redirect the leakage through the upstream gap. In a labyrinth seal used in a gas turbine engine, a stage of rotor blades would include three to five teeth on each blade forming the labyrinth seal with a stepped honeycomb surface on the stationary inner casing of the turbine. With five teeth, four cavities would be formed each with a row of flow deflectors. With three teeth, two cavities would be formed each with flow deflectors.

I claim the following:

1. A stepped labyrinth seal comprising:
   a stationary member having a stepped surface;
   a rotating member having a plurality of teeth, the teeth extending toward the stepped surface of the stationary member;
   adjacent teeth forming a cavity with a cavity floor;
   a plurality of vortex generating strips formed on the cavity floor to redirect a portion of the leakage flow through an upstream tooth back toward the upstream tooth,
   the vortex generating strips also extends up the side of the adjacent teeth forming the cavity,
   the vortex generating strip extending up the downstream tooth narrows until the strip blends into the tooth, and
   the vortex generating strip extending up the upstream tooth end and almost reaching the tip of the upstream tooth.

2. The stepped labyrinth seal of claim 1, and further comprising:
   the vortex generating strip slants downward in the rotating direction of the rotating mean from the downstream tooth toward the upstream tooth.

3. The stepped labyrinth seal of claim 1, and further comprising: the vortex generating strip is also curved to form a concave curvature in the rotating direction of the rotating member.

4. The stepped labyrinth seal of claim 1, and further comprising: the vortex generating strip extending up the upstream tooth end before reaching the tip of the tooth with a substantially flat ending.

5. The stepped labyrinth seal of claim 1, and further comprising:
   the stepped surface is a stepped honeycomb surface.

* * * * *